US00RE35961E

United States Patent [19]

Wiebe

[11] E Patent Number: Re. 35,961

[45] Reissued Date of Patent: Nov. 17, 1998

[54] ARTICULATED RAIL CAR CONNECTOR

[75] Inventor: Donald Wiebe, Sewickley, Pa.

[73] Assignee: Hansen Inc., Pittsburgh, Pa.

[21] Appl. No.: 905,576

[22] Filed: Aug. 4, 1997

Related U.S. Patent Documents

Reissue of:

[64] Patent No.: 5,520,295
Issued: May 28, 1996
Appl. No.: 276,415
Filed: Jul. 18, 1994

[51] Int. Cl.[6] ..... B61G 7/00

[52] U.S. Cl. ..... 213/75 R; 105/4.1; 280/511

[58] Field of Search ..... 105/4.1, 4.2, 3; 213/75 R; 280/511; 403/113, 119

[56] References Cited

U.S. PATENT DOCUMENTS

| | | | |
|---|---|---|---|
| 2,998,268 | 8/1961 | Witter | 280/511 X |
| 3,216,370 | 11/1965 | Kolieke | 105/4 |
| 3,399,631 | 9/1968 | Weber | 105/4 |
| 3,646,604 | 2/1972 | Tack et al. | 105/4 R |
| 3,687,084 | 8/1972 | O'Leary et al. | 105/4 |
| 3,716,146 | 2/1973 | Altherr | 213/75 R |
| 4,319,766 | 3/1982 | Corteg et al. | 280/511 |
| 4,421,339 | 12/1983 | Hagin | 105/3 |
| 4,422,557 | 12/1983 | Altherr | 213/62 R |
| 4,456,133 | 6/1984 | Altherr et al. | 213/62 R |
| 4,545,304 | 10/1985 | Brodeur et al. | 105/3 |
| 4,549,666 | 10/1985 | Altherr et al. | 213/62 A |
| 4,555,033 | 11/1985 | Miller | 213/51 |
| 4,580,686 | 4/1986 | Elliott | 213/62 A |
| 4,700,853 | 10/1987 | Altherr et al. | 213/50 |
| 4,700,854 | 10/1987 | Chadwick | 213/62 R |
| 4,962,861 | 10/1990 | Wiebe | 213/75 R |
| 4,966,291 | 10/1990 | Glover | 213/62 R |
| 5,096,075 | 3/1992 | Glover | 213/75 R |
| 5,105,955 | 4/1992 | Hawryszkow et al. | 213/75 R |
| 5,305,899 | 4/1994 | Kaufhold | 213/75 R |
| 5,560,503 | 10/1996 | Daugherty | 213/75 R |

FOREIGN PATENT DOCUMENTS

| | | | |
|---|---|---|---|
| 2695612 | 3/1994 | France | 213/75 R |
| 2059326 | 2/1990 | Japan | 280/511 |
| 1781092 | 12/1992 | U.S.S.R. | 280/511 |

*Primary Examiner*—Mark Tuan Le
*Attorney, Agent, or Firm*—J. Stewart Brams

[57] ABSTRACT

An articulated connector for flexibly connecting the adjacent ends of a pair of rail car platforms which are supported on a common truck bolster, the connector comprising a spherical bearing formed integrally with a conventional center plate bearing of one car platform, and spherical elements carried by the other car platform for cooperable engagement with the spherical bearing to transmit vertical, lateral and longitudinal train forces between the adjacent platforms solely through engagement of the mating spherical bearing elements.

24 Claims, 3 Drawing Sheets

ARTICULATED RAIL CAR CONNECTOR

Matter enclosed in heavy brackets [ ] appears in the original patent but forms no part of this reissue specification; matter printed in italics indicates the additions made by reissue.

BACKGROUND OF THE INVENTION

Articulated rail cars are well known in the railway art, and generally comprise a pair of rail car platforms arranged end-to-end with the mutually adjacent ends thereof supported by a common truck. For example, a center plate portion of one platform connector element may be supported on the bolster center plate of a conventional three piece truck in the usual manner. The truck bolster center plate surface supports and laterally retains the corresponding center plate bearing surface of one car platform connector element, and the other car platform connector element engages the first mentioned platform connector element to provide a flexible connection therebetween.

In the prior art, the flexible connection between the adjacent ends of the two car platforms, and their retention with respect to a common truck, has often been achieved through employment of an articulating joint assembly including complex and precisely aligned, nested bearing elements having spherical engagement surfaces to provide the necessary three rotational degrees of freedom to accommodate relative pitch, yaw and roll movement of the connected car platforms with respect to each other. In one such prior articulating connector, one of the two adjacent platform ends is supported on a truck bolster center plate surface as noted above. The other of the two platform ends is supported vertically by a spherical bearing segment that nests above the center plate of the first mentioned platform end. Longitudinal train action forces are transmitted between the two platforms through other sets of spherical segments which share a common center of rotation with the spherical segment that provides the vertical support.

Examples of known articulating connection assemblies are shown in U.S. Pat. Nos. 3,399,631, 3,646,604 and 3,716,146. My prior U.S. Pat. No. 4,962,861 discloses an articulating connector unlike such conventional articulating connectors as those characterized hereinabove, and in which the requisite three relative degrees of rotational freedom are not required to share a common center of rotation.

A common feature of many articulating connectors is a vertically extending pivot pin which is used to assemble and locate the various spherical bearing segments with a common center. These spherical bearing surfaces transmit buff and draft loads between the connected car platforms; however, the draft loads sustained by prior articulating connectors also have been transmitted between the connected platforms by the vertically extending pin. Thus, the loads borne by prior articulating connectors are transmitted through both the concentrically nested spherical bearing surfaces and the generally cylindrical bearing surfaces of the pin. For proper connector operation, all of these bearing surfaces must maintain their concentric alignment and position.

Conventional articulating connectors commonly are rather complex structures, typically including, as has been noted, both the cylindrical center pin and an arrangement of spherical bearing surface segments in the male and female connector elements for carrying buff and draft loads. Specifically, the primary active bearing surface of the male connector member of prior articulating connectors may be a convex spherical or concave spherical bearing surface, depending on whether the load being borne is a buff or a draft load. Similarly, the primary active bearing surface of prior female connector members may be either an essentially cylindrical surface engaging the cylindrical center pin for draft loads, or a concave spherical bearing surface for buff loads.

Due to the number of separate parts, including bearing segments, which make up conventional articulating connector assemblies, their inherent complexity, and the required level of manufacturing precision, known articulating connectors currently in revenue service have been costly to manufacture and difficult to assemble and disassemble, and in addition have been difficult to maintain and service. Concerning this latter difficulty, critical wear patterns on the spherical bearing interfaces which transfer the loads between the ends of the interacting platforms can cause the connector to bind or lock.

The longer and more heavily loaded container platforms of modem articulated cars typically require 125 ton trucks. Each platform can carry two or more containers, often stacked two high, to achieve maximum volume capacities. Under such loading conditions, each truck supporting the adjacent ends of two platforms must bear up to 140,000 pounds of vertical center plate load. With these heavier center plate loads and greater utilization overall, prior articulating connectors can sustain sufficient wear, including bearing surface galling, during relatively short periods of revenue surface to cause connector components to bind or lock, with resultant severe hinging restraint between adjacent platforms. Horizontal hinging restraint can precipitate rail roll-over on curves, resulting in derailment.

Wear in prior connectors has also caused reduced vertical side bearing clearance resulting in the need for frequent side bearing clearance adjustment. Additionally, progressive wear from longitudinal forces can produce asymmetry among the various engaged spherical bearing elements of an articulated connector, even in connectors that can compensate for wear accumulation, with possible resultant binding and galling at the interfacing bearing surfaces.

BRIEF SUMMARY OF THE INVENTION

I have now invented a novel and improved articulating rail car connector with a geometry that offers improved and simplified design, case of manufacture and assembly and disassembly, and improved performance characteristics with reduced wear potential. My present articulating connector furnishes enlarged buff and draft force bearing surface areas, and a symmetrical configuration which provides equal spherical interfaces for both buff and draft loads. More uniform distribution of both friction forces and buff and draft loads across the spherical bearing interfaces thus is achieved.

In addition, my novel connector provides a simplified bearing arrangement wherein all of the bearing surfaces of one connector member are convex spherical surfaces and all of those of the other connector member are concave spherical surfaces. No center pin or other cylindrical bearing surface engagement is active in transmission of buff and draft loads between the connector members. This simplicity of structure and symmetry of design produces improved symmetry of wear patterns and accordingly is less prone to develop high frictional tangential force components at the connector assembly load bearing interfaces. Such frictional tangential force components can restrain relative rotational movement between the connected platforms.

With my present invention, the spherical bearing interfaces for draft and buff load transmission need not share a common vertical center line with a truck center plate, thus reducing the level of manufacturing precision required. The spherical bearing surfaces also furnish a larger surface area for carrying the vertical load or weight of the platform supported by the male portion of the connector. The present invention also permits easy assembly and disassembly in any state of normal connector wear in that the connected platforms can be readily separated simply by removing a wear adjusting takeup wedge and a spherical draft bearing segment. By contrast, prior articulating connectors can become increasingly difficult to disassemble after progressive wear has distorted the spherical bearing interfaces and binding of the horizontal hinging freedom has changed the vertical center pin alignment.

The connector of the present invention will also generally contribute less tare weight to the articulated rail car than prior articulating connectors. Moreover, the present invention also affords the advantage of greater available clearance for an increased range of angular displacement between the male and female connector elements in all three rotational directions. Such increased range of angular displacement is achieved without structural, performance or other design concessions.

It is therefore one object of the invention to provide a novel and improved rail car connector for connecting the adjacent ends of a pair of rail car platforms for support thereof on a common truck.

Another object of the invention is lo provide an articulating rail car connector having improved simplicity and symmetry of design.

A further object of the invention is to provide an articulating rail car connector including a pair of connector members with spherical bearing surfaces for transmission of loads therebetween, one of the connector members having exclusively concave spherical bearing surfaces and the other having exclusively convex spherical bearing surfaces.

These and other objects and further advantages of the invention will be more readily appreciated upon consideration of the following detailed description and the accompanying drawings, in which.

Figure 4:
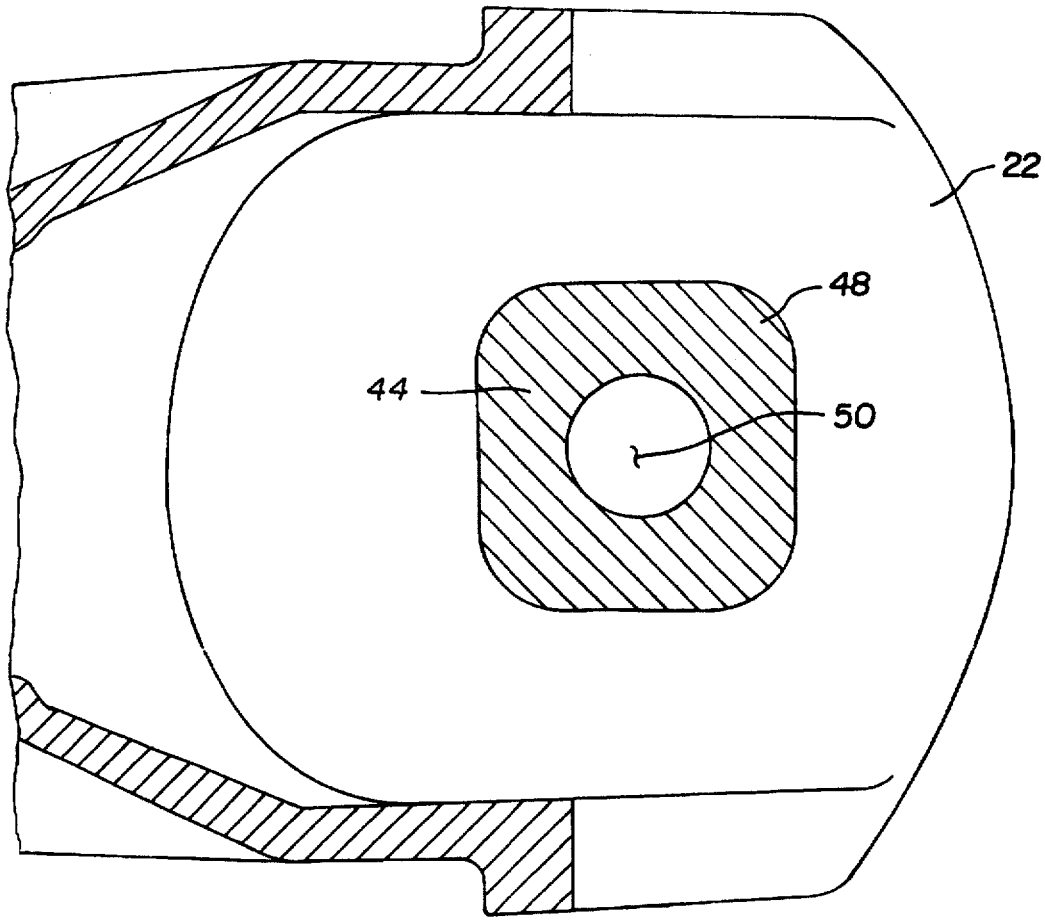
Figure 2:
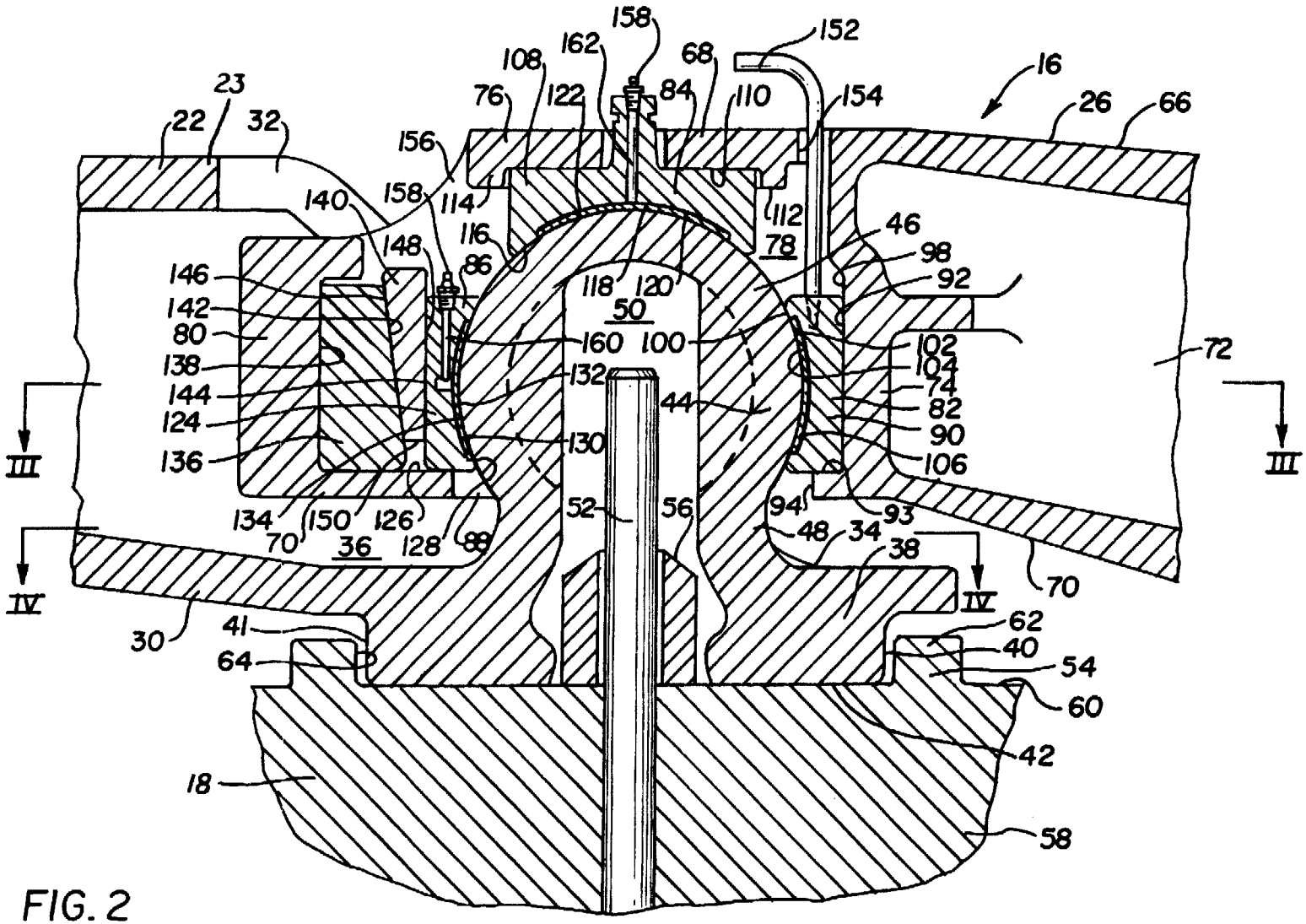
FIG. 2 is an enlarged fragmentary portion of FIG. 1 showing the connector of FIG. 1 in longitudinal section.

FIG. 4 a sectioned plan view taken on line IV—IV of FIG. 2.

Figure 1:
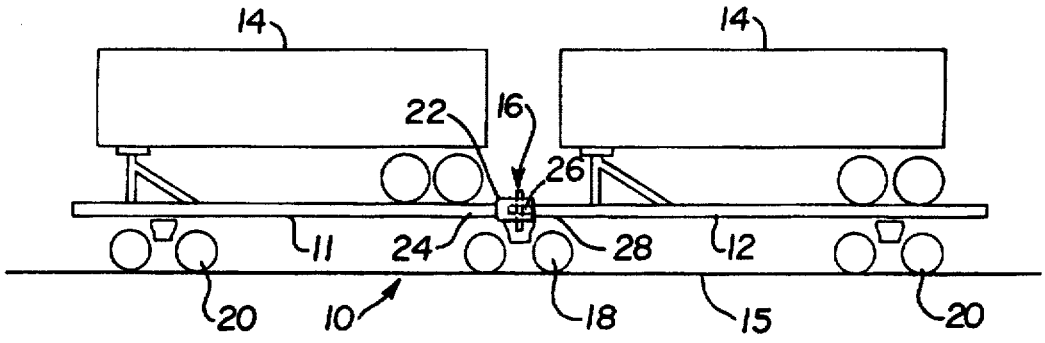
FIG. 1 is a generally schematic representation of a rail car assembly shown in side elevation and including a connector according to one presently preferred embodiment of the instant invention.

There is generally indicated at 10 in FIG. 1 a rail car assembly comprised of adjacent longitudinally aligned platforms 11 and 12, each bearing a containerized load 14, a truck trailer for example although other modes of containerized loading may be utilized. Platforms 11 and 12 are supported with respect to conventional track 15 by means of a pair of spaced apart, conventional wheeled trucks 20 supporting their opposed ends, and an intervening center truck 18, also a conventional wheeled truck although not necessarily identical to either of trucks 20, supporting the adjacent ends 24, 28 of platforms 11 and 12, respectively.

An articulating connector generally indicated at 16 includes male and female connector portions 26 and 22, respectively, which are carried by platform end portions 28 and 24, respectively, to transmit train action buff and draft loads and all other loads imposed upon either of platforms 11 and 12 by the other. Connector 16 also cooperates with truck 18, for example with a bolster center plate portion 58 thereof (FIG. 2), to support the respective adjacent platform ends 24, 28 with respect to the track 15.

In order to allow rail car 10 to track properly through changes of track grade, lateral curvature and superelevation, articulating connector 16 must provide three rotational degrees of freedom to permit the platforms 11 and 12 to move relative to each other in pitch, yaw and roll, respectively. In terms of relative platform movement, pitch is rotation of one platform with respect to the other in a generally vertical plane, yaw is lateral or azimuthal rotation of one platform with respect to the other in a generally horizontal plane, and roll is rotation of one platform with respect to the other about a generally longitudinally extending axis.

The rail car structure shown in FIG. 1 and described hereinabove, excepting only the novel connector 16, is well known in the art and further detailed description thereof is believed unnecessary for an understanding of the present invention.

Figure 3:
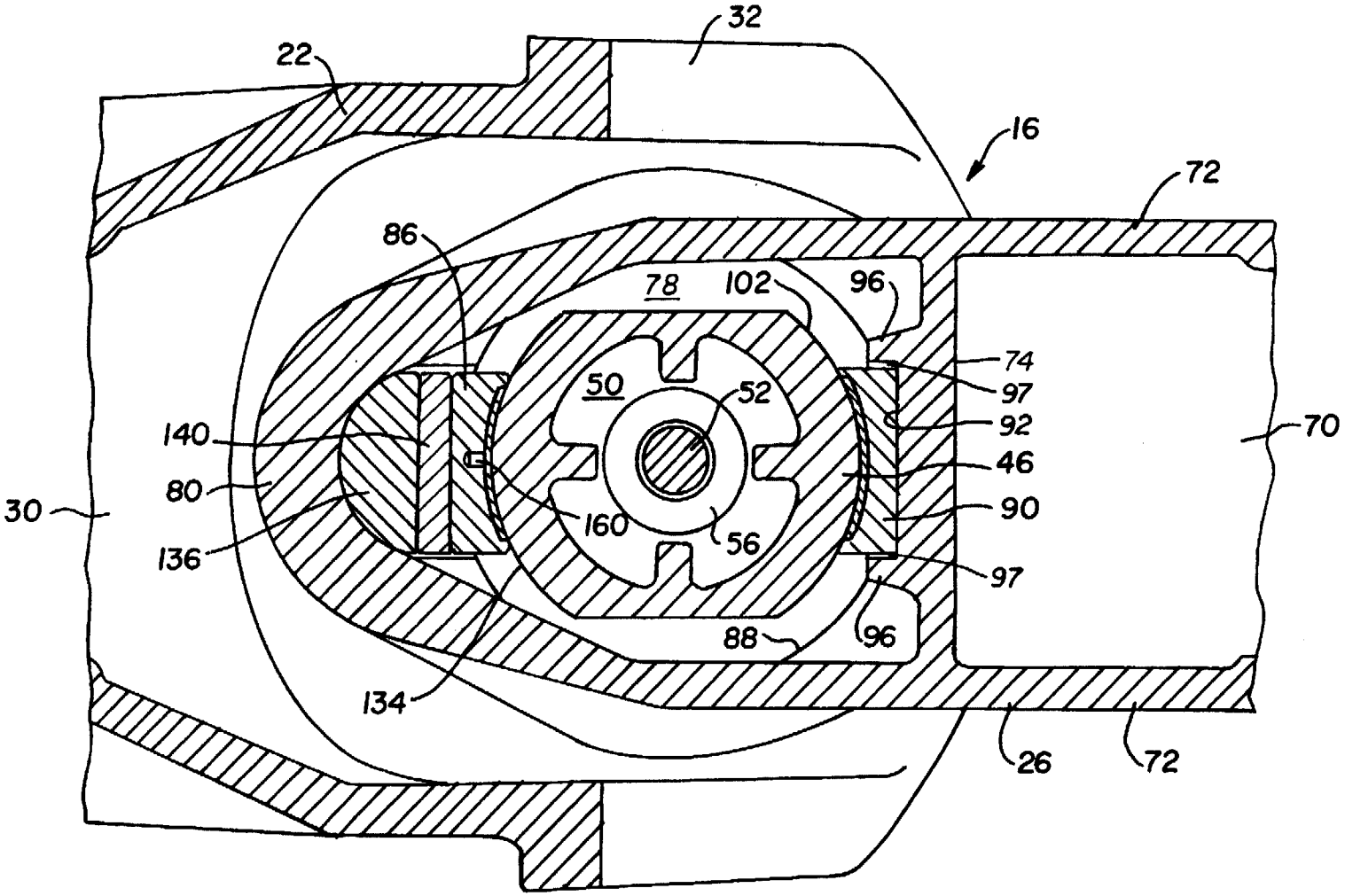
FIG. 3 is a sectioned plan view taken on line III—III of FIG. 2.

Referring now to FIGS. 1, 2 and 3, the female portion 22 of connector 16 is rigidly affixed in a conventional manner, by welding for example, with respect to car platform end 24. Similarly, male connector portion 26 is affixed to platform end 28.

Female connector portion 22 includes an elongated body member 23 which projects longitudinally from platform end portion 24 and has a longitudinally projecting base portion 30 formed integrally with a pair of laterally spaced, upstanding, longitudinally extending sidewall portions 32. Sidewalls 32 extend diagonally downward and longitudinally outward to merge with base portion 30 as indicated at 34, thereby providing an upwardly and longitudinally outwardly opening pocket 36 for receiving the male connector portion 26.

Adjacent an outer end of its base portion 30, female connector portion 22 is provided with a downwardly projecting center plate bearing portion 38 having a generally cylindrical peripheral wall portion 40 and a generally flat, downwardly facing circular center plate bearing surface 42. Wall portion 40 forms a generally cylindrical center plate bearing surface 41, which is cooperable with conventional truck elements including a center plate 54 to be described hereinbelow, to laterally restrain connector portion 22 with respect to truck 18.

A spherical bearing means 44 is formed integrally with base portion 30 of connector member 22 and projects upwardly therefrom, preferably but not necessarily in coaxial alignment with center plate portion 38. Spherical bearing means 44 includes an upstanding, at least partially spherical body portion 46 and a neck portion 48 which extends vertically intermediate base portion 30 and body portion 46.

A downwardly open cavity 50 extends vertically within spherical bearing means 44 and preferably in mutual coaxial alignment with center plate portion 38, neck portion 48 and body portion 46. Cavity 50 is utilized in conjunction with a locating pin 52 which projects coaxially upward of truck bolster center plate portion 54 to facilitate proper location of connector portion 22 with respect to the bolster center plate 54 during assembly. To further To further facilitate assembly, an annular collar 56 encompasses pin 52 and is supported coaxially with respect to the bolster center plate portion 54.

Cavity 50 is of suitable cross-sectional form and size that, when connector portion 22 is assembled with truck 18 and supported by engagement of connector center plate bearing portion 38 on bolster by center plate portion 54, neither the pin 52 nor collar 56 can engage any interior peripheral portion of cavity 50 in load bearing engagement. Rather, all lateral loads imposed between the truck bolster 58 and connector portion 22 are carried by engagement of the cylindrical center plate bearing surface 41 with a cooperating bolster center plate bearing surface 64.

More specifically, the bolster 58, which is preferably of a conventional design, includes an upwardly facing surface 60 having thereon the integrally formed center plate portion 54 which includes a generally annular, upwardly projecting collar or ring portion 62 having an inner, generally cylindrical peripheral bearing surface 64. When in assembly with connector portion 22, surface 64 resides radially outwardly adjacent center plate bearing surface 41 at sufficiently close spacing to provide all required lateral bearing support of connector portion 22 with respect to bolster 58. Accordingly, any lateral movement of connector potion 22 with respect to bolster 58 in any radial direction will bring surfaces 41 and 64 into abutting, load bearing engagement before the available clearance between the inner periphery of cavity 50 and pin 52 or collar 56 is taken up.

Male connector portion 26 includes a formed, elongated body member 66 which projects longitudinally from platform end portion 28 and has integrally formed, vertically spaced apart top and bottom peripheral walls 68 and 70, respectively, which are joined by a pair of integrally formed, laterally spaced vertical sidewalls 72. An interior, transverse wall portion 74 is also formed integrally with wall portions 68, 70 and 72 intermediate the longitudinal ends of male connector portion 26.

Connector portion 26 further includes an elongated free or outer longitudinal end 76 which extends longitudinally outward from transverse wall portion 74 and defines therein a cavity 78 within the confines of the respective wall portions 68, 70, 72 and 74. End portion 76 further includes a transverse, longitudinally outermost wall portion 80 which is formed integrally with the wall portions 70 and 72 to provide a longitudinally outermost closure for cavity 78.

Cavity 78 receives and retains a plurality of spherical bearing segments 82, 84 and 86 with respective, discontinuous spherical bearing surfaces 100, 116 and 128 for engagement with body portion 46 of spherical bearing means 44 upon insertion of the body portion 46 into cavity 78 through an opening 88 which is formed in lower wall 70 of male connector portion 26 as shown in FIGS. 2 and 3 and further described hereinbelow, spherical bearing surfaces 100, 116 and 128 are preferably truncated spherical surface portions of a common sphere to facilitate bearing engagement thereof with bearing means 44.

More specifically, spherical bearing segment 82 comprises bearing body member 90 which resides within cavity 78 in engagement with a peripheral surface 92 thereof formed by transverse wall 74. Bearing body 90 can also be vertically supported upon an upper surface 93 of a formed, laterally extending shoulder 94 which is formed integrally with transverse wall 74 and extends outwardly of the wall surface 92. Bearing body 90 is confined in the lateral direction by laterally spaced shoulders 96 (FIG. 3), also formed integrally with transverse wall 74 and extending outwardly of surface 92 in the same direction as shoulder 94. A predetermined lateral spacing 97 is provided between the shoulders 96 to permit bearing body 90 a limited range of lateral movement with respect to connector portion 26. Similarly, surface 92 extends sufficiently above the uppermost extent of bearing body 90, as indicated at 98 in FIG. 2, to permit bearing body 90 a limited range of vertical freedom with respect to connector portion 26. This vertical freedom provides space for adjustment of bearing segment 82 in a vertical direction with respect to connector portion 26 to permit proper fitup of connector components upon assembly of the connector. As noted hereinabove, the bearing segment also is permitted a range of horizontal freedom between abutments 96. The limited vertical and lateral freedom permits the bearing segment 82 to migrate to its proper location in service. The location thereof is likely to change in service as the connector assembly automatically adjusts to compensate for progressive wear, as described further hereinbelow.

Bearing body 90 includes a spherical bearing surface 100 located and configured to permit cooperable engagement with a corresponding spherical bearing surface portion 102 of body member 46. Surface 100 may additionally be undercut or relieved as shown at 104 to receive a suitable wear insert 106 for bearing engagement with spherical surface 102 of body member 46.

Spherical bearing segment 84 is similar in many respects to the spherical bearing segment 82 described hereinabove. It includes a body member 108 which is retained in bearing engagement with a downwardly facing surface 110 of upper wall portion 68 and is confined in its lateral and longitudinal movements or excursions to a limited range of motion or freedom by plural, depending shoulder elements including integrally formed shoulders 112 and 114. Bearing body 108 also includes a spherical bearing surface portion 116 which may include a relief or undercut 118 for receiving a wear insert 120. Surface 116 and/or insert 120 are located and configured to accommodate cooperable bearing engagement with a corresponding upper spherical bearing surface portion 122 of bearing body member 46.

Spherical bearing segment 86 is similar in many respects to spherical bearing segments 82 and 84 described hereinabove, and includes a bearing body 124 which can be vertically supported upon an upwardly facing surface 126 of lower wall 70. Bearing body 124 includes a spherical bearing surface 128 which may be relieved as indicated at 130 to receive a wear insert 132. Surface 128 and/or insert 132 are formed to accommodate cooperable engagement with a corresponding spherical bearing surface portion 134 of bearing body member 46.

Bearing segment 86 is retained for engagement with bearing body member 46 by a gravitationally operative slack or free play takeup assembly which includes a supporting block 136 disposed in engagement with an inwardly facing surface 138 of transverse end wall 80. The bearing block 136 is supported vertically upon surface 126.

Bearing segment 86 is spaced longitudinally inwardly from bearing block 136 and a gravity wedge member 140 is received therebetween. In the assembled configuration, preferably flat confronting surfaces 142 and 144 of bearing block 136 and spherical bearing segment 86, respectively, diverge upwardly at a predetermined, suitable wedge angle for engagement with respective surfaces 146 and 148 of gravity wedge 140. The surfaces 146 and 148 converge downwardly at the same predetermined wedge angle. The lower end 150 of gravity wedge 140 is truncated sufficiently far from the apex of the converging surfaces 146 and 148 to provide a clearance between the lower end 150 of wedge 140 and surface 126. Gravity thus continuously urges wedge 140 downwardly in the space between surfaces 142 and 144 to the full extent available, thereby continuously taking up all longitudinal slack in the connector assembly.

In the assembled configuration, connector portion 22 is engaged upon bolster center plate 54 in the above-described manner. Spherical bearing body portion 46 of connector portion 26 is received through opening 88 and into engagement with spherical bearing segment 84 to provide the primary vertical support of connector portion 26 and its associated car platform with respect to connector portion 22 and the truck bolster 58. It will thus be noted that the vertical support interface between the connector portions 22 and 26 is above the longitudinal or buff and draft bearing interfaces. The limited lateral and longitudinal movement available for bearing segment 84 within the confines of shoulders 112 and 114 with respect to connector portion 26 permits limited bearing adjustment for proper engagement or fitup thereof with bearing body 46 on assembly while the bearing body portion 46 is brought into bearing engagement with spherical bearing segment 82.

In order to maintain the proper position for spherical bearing segment 82 during assembly and to permit manipulation of the same prior to final fitup of the connector elements, an upwardly extending handle 152 suitably connected to spherical bearing segment 82 may be provided. Handle 152 extends upwardly of upper wall 68 through an opening 154 as shown.

Finally, bearing block 136, if not already in place, is inserted through an upper opening 156 in connector portion 26 into the position above described. Spherical bearing segment 86 is similarly inserted and positioned in bearing engagement with bearing body 46 as above described, and wedge 140 is then inserted between bearing block 136 and spherical bearing segment 86.

The assembled connector provides transmission of all loads between the adjacent rail car platforms 11 and 12 as follows. Spherical bearing segment 84, as above noted, provides the primary vertical support of connector portion 26 and platform 12 with respect to connector portion 22 and truck bolster 58. Because the bearing engagement provided by surface 116 and/or insert 120 is of spherical form corresponding to the spherical form of surface 122, longitudinal and lateral restraint components are also developed at the bearing interface between spherical bearing segment 84 and body 46. In addition, since the spherical bearing segments 86 and 82 are positively interlocked with spherical bearing body 46 due to the automatic slack compensation provided by the gravity wedge 140, bearing segments 82 and 86 provide vertical restraint which prevents vertical separation of the male and female connector elements.

The included angle of contact between bearing segment 84 and bearing body 46 in the transverse plane of symmetry must be sufficient to provide the necessary lateral restraint components of one car platform with respect to the other. The top spherical bearing segment 84 is the preferred bearing to carry lateral restraint loads between the male and female connector portions because the bearing segment 84 also carries the vertical loads between the male and female connector portions. Since the vertical load is large and of predictable magnitude, the available lateral restraint will be a predictable lateral component of the vertical load of a magnitude limited by the angle subtended by bearing segment 84 surface 116 on the corresponding spherical surface of bearing body 46 in a vertical plane perpendicular to the plane of FIG. 2.

For all modes of relative lateral roll motion that may occur between platforms 11 and 12, and the lateral loads between bearing segment 84 and bearing body 46, sufficient lateral restraint must be available to maintain proper bearing engagement and fitup between the male and female connector portions. Accordingly, the lateral angle subtended by engagement of bearing segment 84 upon bearing body 46 must be large enough to carry the maximum developed lateral loads even under conditions of maximum relative lateral roll position between the male and female connector portions. The lateral load can be, for example, as much as one half the magnitude of the vertical load. Therefore, the function arctan 0.50 plus the maximum roll angle would, by way of example, give an angle of lateral wrap for engagement between bearing segment 84 and bearing body 46. In a preferred embodiment, the concave-spherical bearing surface of bearing segment 84 preferably will subtend an included angle on the corresponding spherical surface of bearing body 46, of approximately 75°. Thus, when both connector portions are aligned vertically the subtended angle of contact between bearing segment 84 and bearing body 46 extends 37.5° transversely to either side of a vertical centerline. If the male and female connector portions were not subject to relative lateral rolling movement with their respective car platforms, it is believed the above-referenced subtended angle of bearing contact could be as small as 67°, or 33.5° to either side of the centerline; however, to accommodate the reduction in the subtended angle to one side of center, and the corresponding increase on the other side of center when the car platforms are at the limit of relative roll, an additional 4° of angular contact is provided to each side of center thus giving the preferred 75° angle.

As noted, the subtended angle of engagement between bearing segment 84 and bearing body 46 in the transverse plane must also accommodate the necessary range of lateral roll freedom between the car platforms. Accordingly, while the preferred 75° subtended angle of contact can be increased to provide greater lateral restraint capacity, it is believed the increase would preferably be limited to approximately an additional 4° of subtended angle on either side of center as extensions of the subtended angle beyond this may interfere with relative roll freedom, or unnecessarily complicate the engineering design of a connector that can provide the necessary roll freedom. Accordingly, if one observes a limit of an additional 4° of subtended angle to either side of center, a preferred maximum subtended angle would be 8° greater than the preferred 75° degree angle, or 83°.

Similarly, bearing segment 82 engages the spherical surface 102 of bearing body portion 46 in a manner to bear buff loads imposed between platforms 11 and 12; however, because the bearing interface between bearing segment 82 and surface 102 is spherical, components of vertical and lateral reactions can also develop therebetween. Likewise, spherical bearing segment 86 engages spherical surface 134 of bearing body portion 46 to support draft loads imposed between platforms 11 and 12; however, because the bearing interface between bearing segment 86 and surface 134 is spherical, vertical and lateral reactions can also develop therebetween.

Although not absolutely required, it is certainly preferable that the spherical radius be the same for all of the spherical bearing surfaces or surface portions above described for purposes of design simplicity, manufacturing economy and service reliability. The various spherical bearing surfaces, in the assembled state, do share a common center. Additional design and operational simplicity results from having buff loads transmitted primarily through a first spherical bearing interface, draft loads primarily through a second spherical bearing interface and vertical and lateral loads primarily through a third spherical bearing interface. This aspect of the invention also contributes significantly to improved service reliability and wear characteristics.

Additional or ancillary features of the invention are shown in FIGS. 2 and 3. Specifically, lubrication fittings 158 are mounted on selected ones of the spherical bearing segments such as segments 84 and 86, and respective connecting channels 160, 162 are formed therein for the purpose of directing lubricant to the bearing interface between the respective bearing segments 84 and 86, and the spherical bearing body member 46. Similar lubrication capability may be provided for bearing segment 82.

In order to minimize the stress concentrations in neck portion 48 of spherical bearing means 44 the neck portion 48 may be of any suitable cross-sectional form, for example a generally square or rectangular form with rounded corners of relatively large radius such as shown in FIG. 4. Other suitable configurations, consistent with the design limitations of the connector, may also be employed. Among the design limitations to be reckoned with are clearance requirements, strength characteristics consistent with the loads to be borne, and the range of relative pitch, yaw and roll movements that must be accommodated.

Notwithstanding the description hereinabove of certain presently preferred embodiments of the invention, it will be understood that I have contemplated various alternative and modified embodiments, and such would certainly also occur to others versed in the art once they were apprised of my invention. Accordingly, it is my intention that the invention should be construed broadly and limited only by the scope of the claims appended hereto.

I claim:

1. In a rail car assembly having a wheeled truck with wheels which are engagable with a railway [truck] *track* for rolling movement thereon, and a pair of rail car platforms having adjacent ends thereof supported in common by the truck, a connector apparatus that is cooperable with such a truck and such adjacent platform ends to transmit loads between the pair of platforms while maintaining flexible support of the adjacent platform ends with respect to each other and with respect to the truck, said connector apparatus comprising:

a first connector portion rigidly affixed to one of such adjacent platform ends;

a second connector portion rigidly affixed to the other of such adjacent platform ends;

one of said first and second connector portions including center plate bearing means adapted for cooperation with a bearing portion of such a truck to provide vertical and lateral support of said one of said connector portions with respect to such a truck;

said one of said connector portions further including a first bearing means having convex spherical bearing surface means, and said other of said connector portions including a second bearing means having concave spherical bearing surface means;

said first and second bearing means being mutually cooperable to provide load bearing support of said connector portions with respect to one another; and at least one of said concave and convex spherical bearing surface means being a discontinuous spherical bearing surface means comprised of a plurality of truncated spherical bearing surface elements which are engagable with the other of said concave and convex spherical bearing surface means to provide substantially all required load bearing support of said connector portions with respect to one another.

2. The connector as set forth in claim 1 wherein said first bearing means is an upstanding, integral bearing portion of said one connector portion.

3. The connector as set forth in claim 2 wherein said upstanding, integral bearing portion extends generally coaxially with respect to said center plate bearing means.

4. The connector as set forth in claim 3 wherein said upstanding, integral bearing portion and said center plate bearing means include vertically extending cavity means adapted to receive locating pin means of such a truck therein.

5. The connector as set forth in claim 1 additionally including compensation means which is cooperable with at least one of said plurality of truncated spherical bearing surface elements to continuously compensate for slack between said first and second connector portions.

6. The connector as set forth in claim 5 wherein said compensation means is a gravitationally operable compensation means.

7. The connector as set forth in claim 6 wherein said gravitationally operable compensation means includes wedge means operable under the influence of gravity to continuously urge said at least one of said plurality of truncated spherical bearing surface elements into engagement with said load bearing surface means of said other of said connector portions.

8. The connector as set forth in claim 1 wherein said plurality of truncated spherical bearing surface elements includes at least a first spherical bearing surface element disposed for vertical and lateral load bearing support of said connector portions with respect to one another.

9. The connector as set forth in claim 8 wherein said first spherical bearing surface element is engagable with a respective spherical bearing surface portion of said other of said spherical bearing surface elements throughout an included angle of sufficient magnitude to provide lateral restraint of said connector portions by means of lateral components of vertical loads borne by engagement of said first spherical bearing surface element with said spherical bearing surface portion.

10. The connector as set forth in claim 9 wherein said included angle is in the range of approximately 75° degrees to approximately 83° degrees.

11. The connector as set forth in claim 10 wherein said included angle is approximately 75°.

12. The connector as set forth in claim 1 wherein said at least one of said concave and convex spherical bearing surface means is said concave spherical bearing surface means.

13. The connector as set forth in claim 1 wherein at least some of said plurality of truncated spherical bearing surface elements are independently adjustable with respect to others of said truncated spherical bearing surface elements for engagement with the other of said concave and convex spherical bearing surface means.

14. The connector as set forth in claim 1 wherein said truncated spherical bearing surface elements are of an essentially uniform spherical radius.

15. In a connector assembly for flexibly connecting a pair of adjacent rail car platform ends for the transmission of loads therebetween wherein the connector includes first and second connector portions carried by the adjacent rail car platform ends and each said connector portion includes load bearing surface means, and one of said connector portions includes a plurality of independent bearing elements with a respective plurality of load bearing surface portions which are cooperable with the other of said connector portions to bear loads transmitted between the pair of rail car platforms in a manner that said plurality of load bearing surface portions collectively bear essentially all of the loads transmitted between the pair of rail car platforms, the improvement comprising:

at least some of said load bearing surface portions being truncated spherical bearing surface segments forming a discontinuous spherical bearing surface essentially of a uniform spherical radius.

16. The improvement as set forth in claim 15 wherein said truncated spherical bearing surface segments are concave spherical bearing surface segments.

17. The improvement as set forth in claim 16 wherein ones of said truncated spherical bearing surface segments are independently adjustable with respect to others of said truncated spherical bearing surface segments.

*18. The connector assembly as set forth in claim 2 wherein said first bearing means includes a neck portion connecting said convex spherical bearing surface means to said one of said connector portions.*

*19. The connector assembly as set forth in claim 18 wherein the cross sectional configuration of said neck portion in a generally horizontal plane includes perimeteral portions of said cross sectional configuration having a mean radius equal to or greater than the spherical radius of said convex spherical bearing surface means.*

*20. The connector assembly as set forth in claim 19 wherein said cross sectional configuration of said neck portion is of a generally rectangular form in said horizontal plane.*

*21. The connector assembly as set forth in claim 20 wherein said generally rectangular form includes corner portions and side portions extending intermediate said corner portions, and said perimeteral portions of a radius greater than the spherical radius of said convex spherical bearing surface means include ones of said side portions.*

*22. The improvement as set forth in claim 15 wherein others of said load bearing surface portions are connected to the respective one of said first and second connector portions by a neck portion having a cross sectional configuration with perimeteral portions of a radius greater than the spherical radius of said spherical bearing surface segments.*

*23. The improvement as set forth in claim 22 wherein said cross sectional configuration of said neck portion is a generally rectangular form.*

*24. The improvement as set forth in claim 23 wherein said generally rectangular form includes corner portions and side portions extending intermediate said corner portions, and said perimeteral portions of a radius greater than the spherical radius of said spherical bearing surface segments include ones of said side portions.*

* * * * *